US011671873B2

(12) United States Patent
Bharadwaj et al.

(10) Patent No.: US 11,671,873 B2
(45) Date of Patent: Jun. 6, 2023

(54) HIGH RELIABILITY TRAFFIC FOR VEHICLE-TO-EVERYTHING COMMUNICATIONS

(71) Applicant: QUALCOMM Incorporated, San Diego, CA (US)

(72) Inventors: Arjun Bharadwaj, Cupertino, CA (US); Sudhir Kumar Baghel, Hillsborough, NJ (US); Tien Viet Nguyen, Bridgewater, NJ (US); Kapil Gulati, Hillsborough, NJ (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/938,882

(22) Filed: Jul. 24, 2020

(65) Prior Publication Data
US 2021/0029585 A1   Jan. 28, 2021

Related U.S. Application Data

(60) Provisional application No. 62/879,403, filed on Jul. 26, 2019.

(51) Int. Cl.
*H04W 28/08* (2023.01)
*H04W 72/02* (2009.01)
(Continued)

(52) U.S. Cl.
CPC ......... *H04W 28/0875* (2020.05); *H04W 4/40* (2018.02); *H04W 28/0967* (2020.05);
(Continued)

(58) Field of Classification Search
CPC ......... H04W 28/0875; H04W 28/0967; H04W 4/40; H04W 4/44; H04W 4/46; H04W 92/18
See application file for complete search history.

(56) References Cited

U.S. PATENT DOCUMENTS

2007/0002866 A1\* 1/2007 Belstner ............... H04W 40/00
370/395.4
2017/0070869 A1\* 3/2017 Hewitt ................. H04W 24/02
(Continued)

OTHER PUBLICATIONS

Intel Corporation: "Resource Allocation Schemes for NR V2X Sidelink Communcation", 3GPP Draft, 3GPP TSG RAN WG1 Meeting #95, R1-1812491, Intel—EV2X_SL_RA, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051554435, 15 pages.
(Continued)

*Primary Examiner* — Robert C Scheibel
(74) *Attorney, Agent, or Firm* — Patterson + Sheridan, LLP

(57) ABSTRACT

Certain aspects of the present disclosure provide techniques for high reliability vehicle-to-everything (V2X) communications. Aspects of the present disclosure provide methods that may be performed by a first sidelink device. The first sidelink device may be a roadside unit (RSU) or a user equipment (UE). The first sidelink device may detect traffic from at least a second sidelink device and send the traffic to one or more other sidelink devices. A first sidelink device may receive reservation information from a first plurality of sidelink devices and schedule a second plurality of sidelink devices based on the reservation information.

31 Claims, 18 Drawing Sheets

(51) Int. Cl.
*H04W 28/26* (2009.01)
*H04W 4/40* (2018.01)
*H04W 72/542* (2023.01)
*H04W 72/566* (2023.01)
*H04W 92/18* (2009.01)

(52) U.S. Cl.
CPC .......... *H04W 28/26* (2013.01); *H04W 72/02* (2013.01); *H04W 72/542* (2023.01); *H04W 72/569* (2023.01); *H04W 92/18* (2013.01)

(56) References Cited

U.S. PATENT DOCUMENTS

| | | | |
|---|---|---|---|
| 2019/0380142 A1* | 12/2019 | Wang | H04W 4/06 |
| 2019/0394786 A1* | 12/2019 | Parron | H04L 27/0006 |
| 2020/0128569 A1* | 4/2020 | Hassan Hussein | H04W 72/10 |
| 2020/0275243 A1* | 8/2020 | Ueno | G08G 1/09 |
| 2020/0314727 A1* | 10/2020 | Xu | H04W 40/32 |
| 2020/0351833 A1* | 11/2020 | Chae | H04W 52/383 |
| 2021/0160890 A1* | 5/2021 | Selvanesan | H04W 24/08 |
| 2021/0176720 A1* | 6/2021 | Chae | H04W 92/18 |

OTHER PUBLICATIONS

Intel Corporation: "Sensing Based Collision Avoidance Schemes for V2V Communication", 3GPP Draft, 3GPP TSG RAN WG1 Meeting #84, R1-160432—Intel—V2V Sensing, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 6, 2016 (Feb. 6, 2016), XP051064191, 8 Pages.

Partial International Search Report—PCT/US2020/043684—ISA/EPO—dated Oct. 1, 2020.

AT&T: "Integrated access and sidelink: A unified concept for V2X", 3GPP Draft, 3GPP TSG RAN WG1 Meeting #92bis, R1-1804673 Integrated Access and Sidelink a Unified Concept for V2X, 3rd Generation Partnership Project (3GPP), Mobile Competence Centre, 650, Route Des Lucioles, F-06921 Sophia-Antipolis, vol. RAN WG1, No. Sanya, China; Apr. 16, 2018-Apr. 20, 2018, Apr. 7, 2018 (Apr. 7, 2018), XP051414044, 4 Pages, Retrieved from the Internet: URL: http://www.3gpp.org/ftp/tsg%5Fran/WG1%5FRL1/TSGR1%5F92b/Docs/. p. 3.

International Search Report and Written Opinion—PCT/US2020/043684—ISA/EPO—dated Dec. 18, 2020.

ITL: "Discussion on Sidelink Synchronization Mechanism for NR V2X", 3GPP Draft, 3GPP TSG RAN WG1 #97 Meeting, R1-1907355, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728793, 6 Pages, Retrieved from the Internet: URL: http://www.3gpp.org/ftp/Meetings%5F3GPP%5FSYNC/RAN1/DOCS/R1%2D1907355%2Ezip. [retrieved on May 13, 2019] 3.

Nokia, et al., "Discussion of Resource Allocation for Sidelink—Mode 2", 3GPP Draft, 3GPP TSG RAN WG1 Meeting #97, R1-1906076, Nokia—5G V2X NRSL Resource Allocation Mode 2, 3rd Generation Partnership Project (3GPP), Mobile Competence Centre, 650, Route Des Lucioles, F-06921 Sophia-Antipolis Cedex, Fr, vol. RAN WG1, No. Reno, USA; May 13, 2019-May 17, 2019, May 13, 2019 (May 13, 2019), XP051727533, 7 Pages, Retrieved from the Internet: URL: http://www.3gpp.org/ftp/Meetings%5F3GPP%5FSYNC/RAN1/Docs/R1%2D1906076%2Ezip.

\* cited by examiner

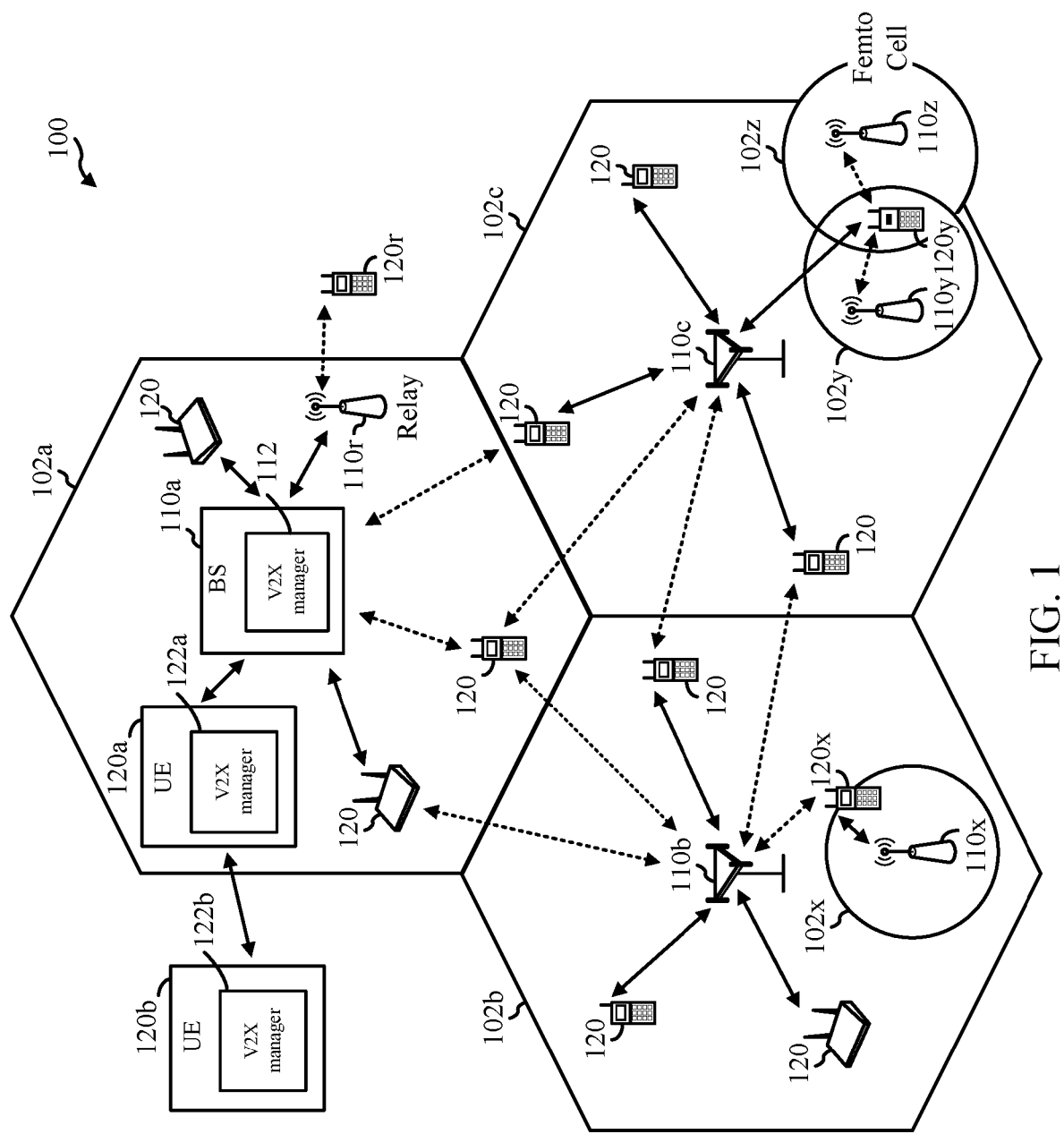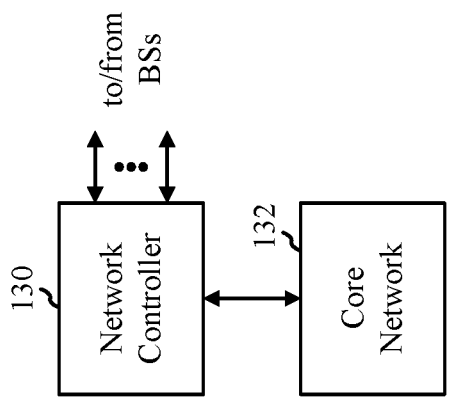
FIG. 1

| Virtual Frame | UE Sequence |
|---|---|
| Start - 10ms | UE1 |
| 10ms - 20ms | UE2    UE3 |
| 20ms - 30ms | UE1    UE5 |
| 30ms - 40ms | UE2    UE4 |
| 40ms - 50ms | UE1 |
| 50ms - 60ms | UE2 |
| 60ms - 70ms | UE1    UE3 |
| 70ms - 80ms | UE2    UE6 |
| 80ms - 90ms | UE1    UE4 |
| 90ms - 100ms | UE2 |

FIG. 10

| rSG-Common | Value | Comments |
|---|---|---|
| Resource Pool Size | 20MHz | Resource Pool Where Scheduled UEs Can Transmit |
| rSG-Dedicated Allocation Size | 15RBs | Allocation Size of rSG Accounting for Link Budget |
| #TTIs for rSG | 1 | Can Potentially Utilize more TTIs in Congested Areas |
| Periodicity of rSRs | 50ms | Access Request Periodicity |
| QoS rSGs/rSRs | 10ms | QoS Enhancements |
| rSR Information | 2 | #TTIs, rSR-S and rSR-NS Split etc. |

FIG. 13

| rSG-Dedicated | Value | Comments |
|---|---|---|
| #Groups | 3 | |
| #UEs in Group | 15, 8, 21 | Lists the #UEs for Each Group |
| Freq Allocation for Each Group | 2, 2, 2 | #Subbands Allocated to Each Group |
| Ordering of UEs | UE1, UE2...<br>UEA, UEB, ...<br>Uex, Uey, ... | UE IDs for Each Group are Ordered |

FIG. 14

HIGH RELIABILITY TRAFFIC FOR VEHICLE-TO-EVERYTHING COMMUNICATIONS

CROSS-REFERENCE TO RELATED APPLICATION(S)

This application claims benefit of and priority to U.S. Provisional Application No. 62/879,403, filed Jul. 26, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for higher reliability traffic for vehicle-to-everything communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Vehicle-to-everything (V2X) communications seek to enable vehicles to communicate with one another to provide a host of services, including vehicle-to-vehicle communications (V2V), vehicle-to-infrastructure (V2I) communications, vehicle-to-grid (V2G) communications and vehicle-to-people (V2P) communications.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved vehicle-to-everything communication traffic with higher reliability.

Aspects of the present disclosure provide methods, means for, apparatus, processors, and computer-readable mediums for performing high reliability V2X communications in accordance with aspects described herein.

Certain aspects of the subject matter described in this disclosure can be implemented in a method for wireless communication by a first sidelink device. The method generally includes detecting traffic from at least a second sidelink device and sending the traffic to one or more other sidelink devices.

Certain aspects of the subject matter described in this disclosure can be implemented in another method for wireless communication by a first sidelink device. The method generally includes receiving reservation information from a first plurality of sidelink devices and scheduling a second plurality of sidelink devices based on the reservation information.

Certain aspects of the subject matter described in this disclosure can be implemented in an apparatus for wireless communication. The apparatus generally includes at least one processor and a memory coupled to the at least one processor. The memory generally includes code executable by the at least one processor to cause the apparatus to detect traffic from at least one sidelink device and send the traffic to one or more other sidelink devices.

Certain aspects of the subject matter described in this disclosure can be implemented in another apparatus for wireless communication. The apparatus generally includes at least one processor and a memory coupled to the at least one processor. The memory generally includes code executable by the at least one processor to cause the apparatus to receive reservation information from a first plurality of sidelink devices and schedule a second plurality of sidelink devices based on the reservation information.

Certain aspects of the subject matter described in this disclosure can be implemented in an apparatus for wireless communication. The apparatus generally includes means for detecting traffic from at least one sidelink device and means for sending the traffic to one or more other sidelink devices.

Certain aspects of the subject matter described in this disclosure can be implemented in another apparatus for wireless communication by a first sidelink device. The apparatus generally includes means for receiving reservation information from a first plurality of sidelink devices and means for scheduling a second plurality of sidelink devices based on the reservation information.

Certain aspects of the subject matter described in this disclosure can be implemented in a computer readable medium storing computer executable code thereon for wireless communications. The computer readable medium generally stored code for detecting traffic from at least one sidelink device and code for sending the traffic to one or more other sidelink devices.

Certain aspects of the subject matter described in this disclosure can be implemented in a computer readable medium storing computer executable code thereon for wireless communications. The computer readable medium generally stored code for receiving reservation information from a first plurality of sidelink devices and code for scheduling a second plurality of sidelink devices based on the reservation information.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example telecommunications system, in accordance with certain aspects of the present disclosure.

FIG. 10 is a table illustrating example RSU traffic scheduling frames for six different UEs with variable packet size and variable latency, in accordance with certain aspects of the present disclosure.

FIG. 13 is a table illustrating example common scheduling grant for RSU traffic scheduling, in accordance with certain aspects of the present disclosure.

FIG. 14 is a table illustrating example dedicated scheduling grant for RSU traffic scheduling, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 2:
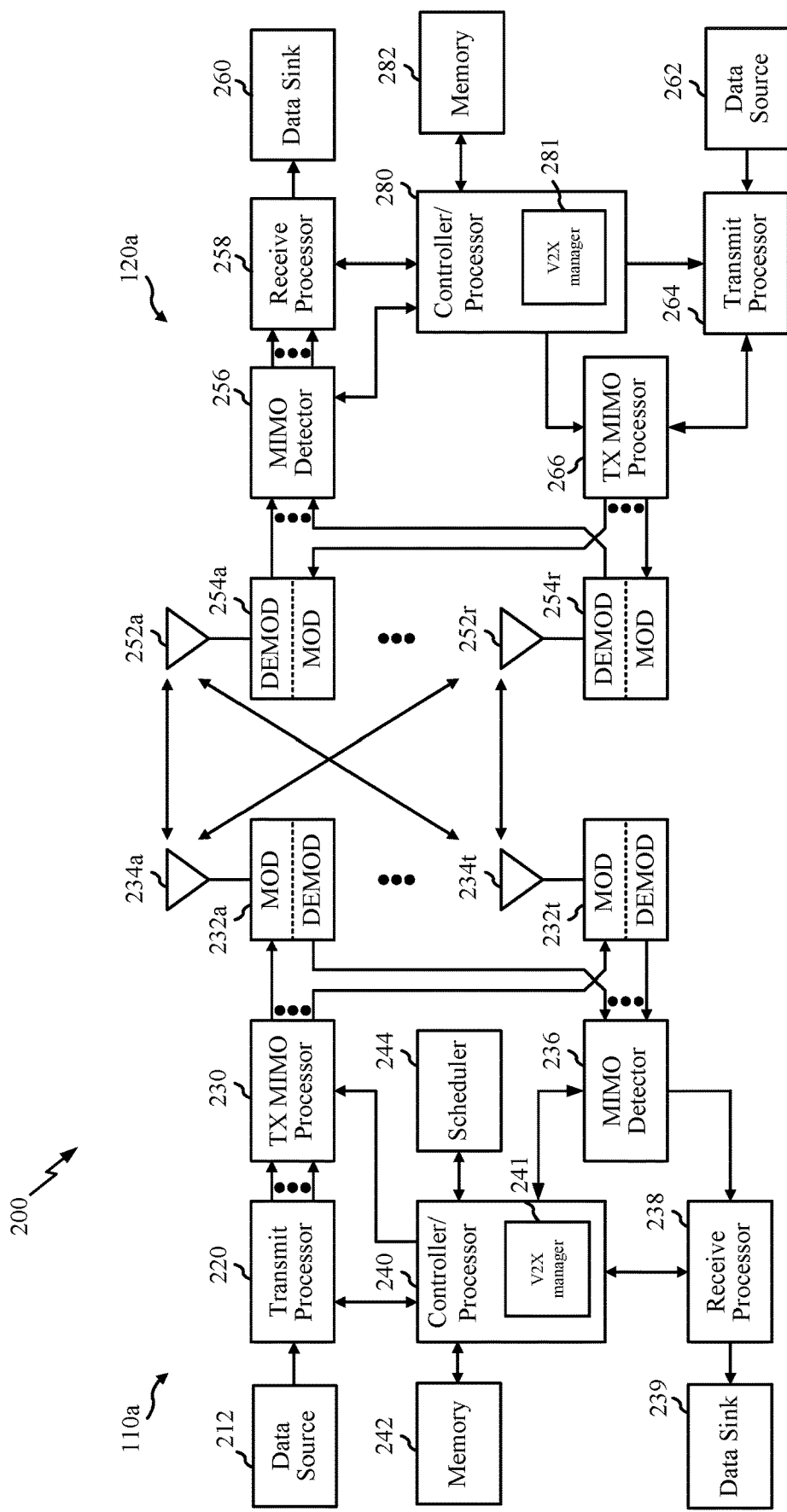
FIG. 2 is a block diagram conceptually illustrating a design of an example a base station (BS) and user equipment (UE), in accordance with certain aspects of the present disclosure.

Aspects of the present disclosure provide apparatus, methods, processing systems, and computer readable mediums for high reliability traffic for vehicle-to-everything (V2X) communications.

Devices in V2X may have high priority traffic. For example, the device may have traffic with high quality-of-service (QoS) requirements, high reliability requirements, and/or low latency requirements. For example, at road intersections, vehicles may have high priority information to provide to other vehicles near the intersection. For example, this information may be critical for vehicle safety. Accordingly, techniques for high reliability traffic in V2X are desirable.

According to certain aspects, roadside units (RSUs) and/or user equipment (UEs) may relay high priority traffic and/or reservation information of other sidelink devices. According to certain aspects, RSUs and/or UEs may collect reservation information of other sidelink devices and schedule the sidelink devices so as to avoid collisions between their transmissions.

The following description provides examples of high reliability traffic for V2X in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave (mmW), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with UEs in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for high reliability traffic for V2X communications. As shown in FIG. 1, the BS 110a includes a V2X manager 112, the UE 120a includes a V2X manager 122a, and the UE 120b includes a V2X manager 122b. The high reliability V2X communications manager 112 and/or 122 may be for performing high reliability V2X communications, such as scheduling, resource allocation, etc., in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a V2X communications manager 241 and the controller/processor 280 of the UE 120a has a V2X manager 241 that may be configured for high reliability V2X communications, according to aspects described herein. Although shown at the Controller/Processor, other components of the UE 120a and BS 110a may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
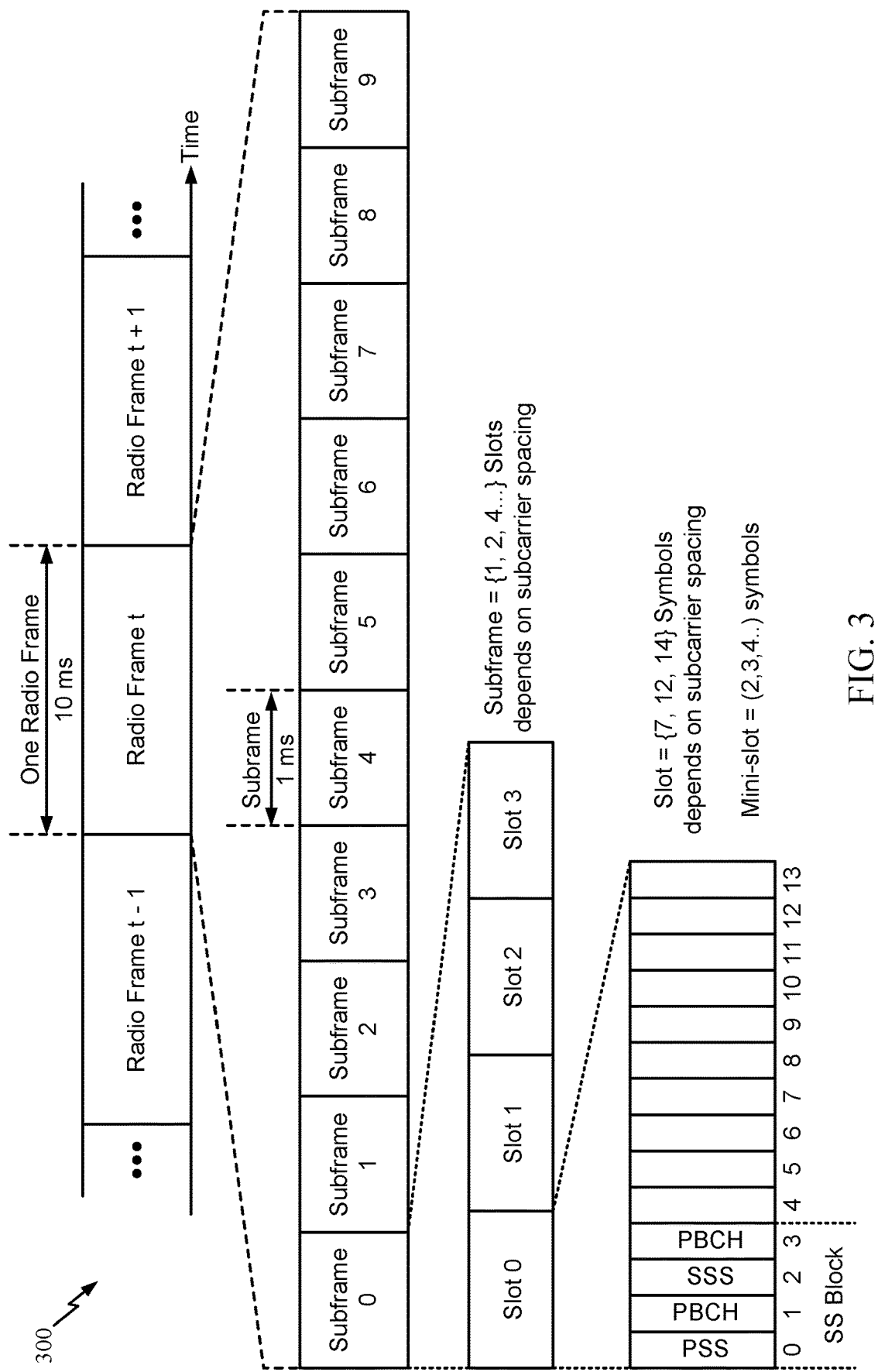
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 5:
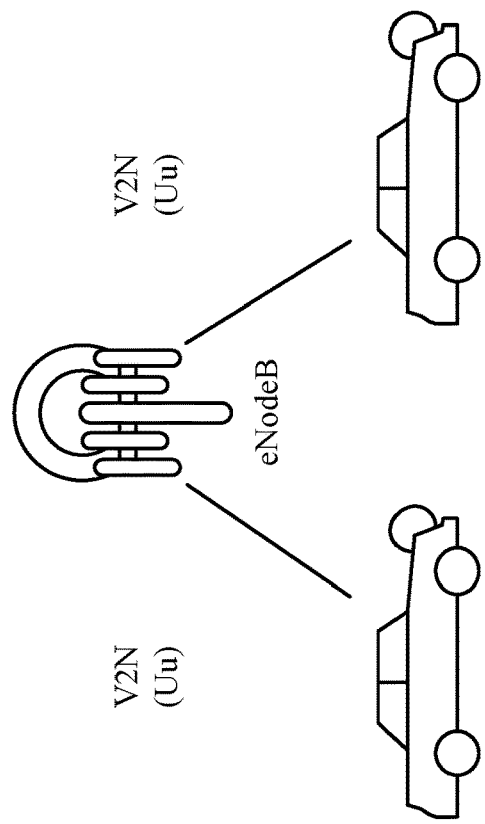
FIG. 5 illustrates another example V2X communication system, in accordance with certain aspects of the present disclosure.
Figure 4:
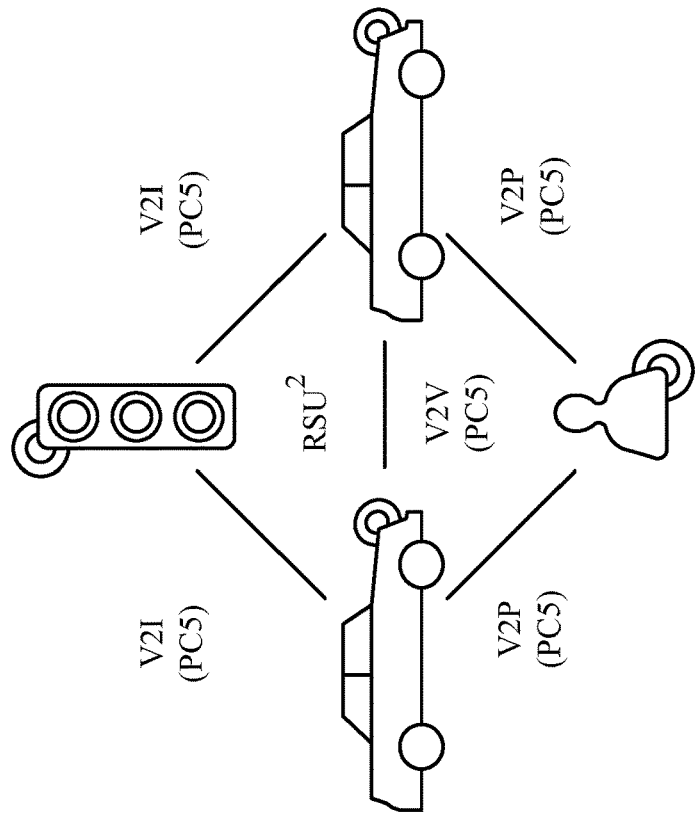
FIG. 4 illustrates an example vehicle-to-everything (V2X) communication system, in accordance with certain aspects of the present disclosure.

As mentioned above, aspects of the present disclosure related to V2X communications. V2X technology allows vehicles to communicate with moving parts of the traffic system around them. V2X may address vehicular wireless communications to enhance road safety and the driving experience. FIG. 4 and FIG. 5 illustrates example V2X systems with two vehicles and with complementary transmission modes. A first transmission mode involves direct communications between participants in the local area as illustrated in FIG. 4. A second transmission mode involves network communications through a network as illustrated in FIG. 5.

In some cases, V2X uses a short-range wireless signal to communicate with compatible systems, and this signal can be resistant to interference and inclement weather. The V2X system can be configured to work in a 5.9 GHz spectrum and, thus, any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may be operated over a wider frequency band of 70 MHz to support advanced safety services in addition to basic safety services. In some examples, the underlying technology for V2X is cellular based (e.g., LTE or 5G).

Referring to FIG. 4, the first transmission mode allows for direct communication between different participants in a given geographic location. As illustrated, a vehicle can have a communication with an individual (V2P) through a PC5 interface. Communications between a vehicle and another vehicle (vehicle-to-vehicle or V2V) may also occur through a PC5 interface. In a like manner, communication (e.g., a signal via a PC5 interface) may occur from a vehicle to other highway components (vehicle-to-infrastructure or V2I), such as street lights, buildings, devices (vehicle-to-device or V2D), and even cyclists or pedestrians (vehicle-to-pedestrian or V2D). In each example illustrated, two-way communication can take place between elements, therefore each element may be a transmitter and a receiver of information. In the configuration shown, the first transmission mode is a self-managed system and no network assistance is provided. Such transmission modes provide for reduced cost and increased reliability as network service interruptions do not occur during handover operations for moving vehicles. Resource assignments may not be coordinated between operators and subscription to a network is not necessary; therefore there is reduced complexity for such self-managed systems.

Referring to FIG. 5, the transmission mode is illustrated. In the illustrated example, a vehicle may communicate to another vehicle through network communications (vehicle-to-network or V2N) or a grid (vehicle-to-grid or V2G). These network communications may occur through discrete nodes, such as BSs (e.g., gNB), that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

High reliability may be desirable for V2X communications. Much of V2X communications suffer from half duplex and collision issues that impact performance. There is a need for some high priority packets to be received with very low error rates.

Accordingly, aspects of the present disclosure provide for high reliability transmissions in V2X.

Example V2X Scheduling

For network communications, roadside units (RSUs) may be utilized as well as 4G/5G small cell communication technologies to benefit in more highly covered areas to allow real time information to be shared among vehicle-to-everything (V2X) users. An RSU may be used for vehicle-to-infrastructure (V2I) communications. In some examples, an RSU may act as a forwarding node to extend coverage for a sidelink device, such as a sidelink user equipment (UE). In some examples, an RSU may be co-located with a BS or may be standalone. As the number of RSUs diminishes, the V2X systems may rely more on small cell communications.

RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the access link (e.g., cellular or Uu) interface (e.g., the logical interface between the UE and BS) and follow Mode-3 scheduling mechanisms. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcast critical information received from some UEs. UE-type RSUs may be a reliable synchronization source, the UE may not need to transmit a sidelink synchronization signal (SLSS) within an RSU coverage area.

Figure 6:
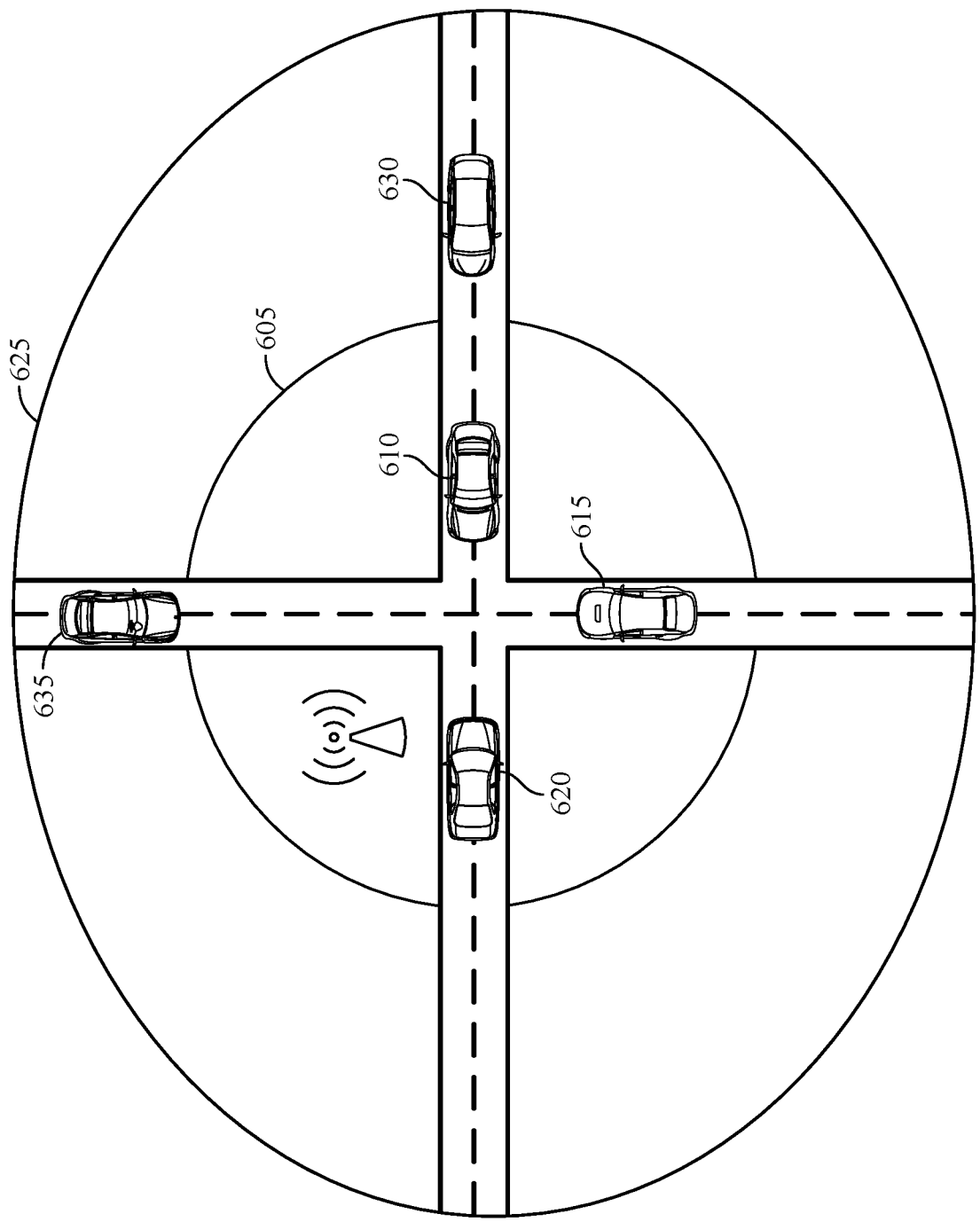
FIG. 6 illustrates example roadside unit (RSU) coverage areas, in accordance with certain aspects of the present disclosure.

RSU coverage areas (or coverage zones) may be asymmetric due to differences in transmit power. The RSU coverage area for transmissions may be much larger than the UE coverage area. As shown in FIG. 6, a first zone 605 may include UEs (e.g., UEs 610, 615, 620) that have been registered with the RSU that are actively being scheduled. A second zone 625 includes UEs (e.g., UEs 630, 635) outside the first zone 605 that may identify and locate the RSU, attempt to register with the RSU, and that are not currently added to the scheduling pool. RSU deployments can change/progress over time. An RSU may be added to a location based on congestion, coverage, applications, level of automation etc. UEs are informed about the RSU location (e.g., via the Uu interface). UEs can maintain a database of RSU locations in a region. The RSU location can also be obtained dynamically as UEs move into different regions. UEs may begin registering and communicating with an RSU as the UE moves into the RSU coverage area. Out-of-coverage UEs are initially unaware of the location/presence of an RSU, and may autonomously detect presence of RSU (e.g., based on reception of RSU common grant information).

Figure 7:
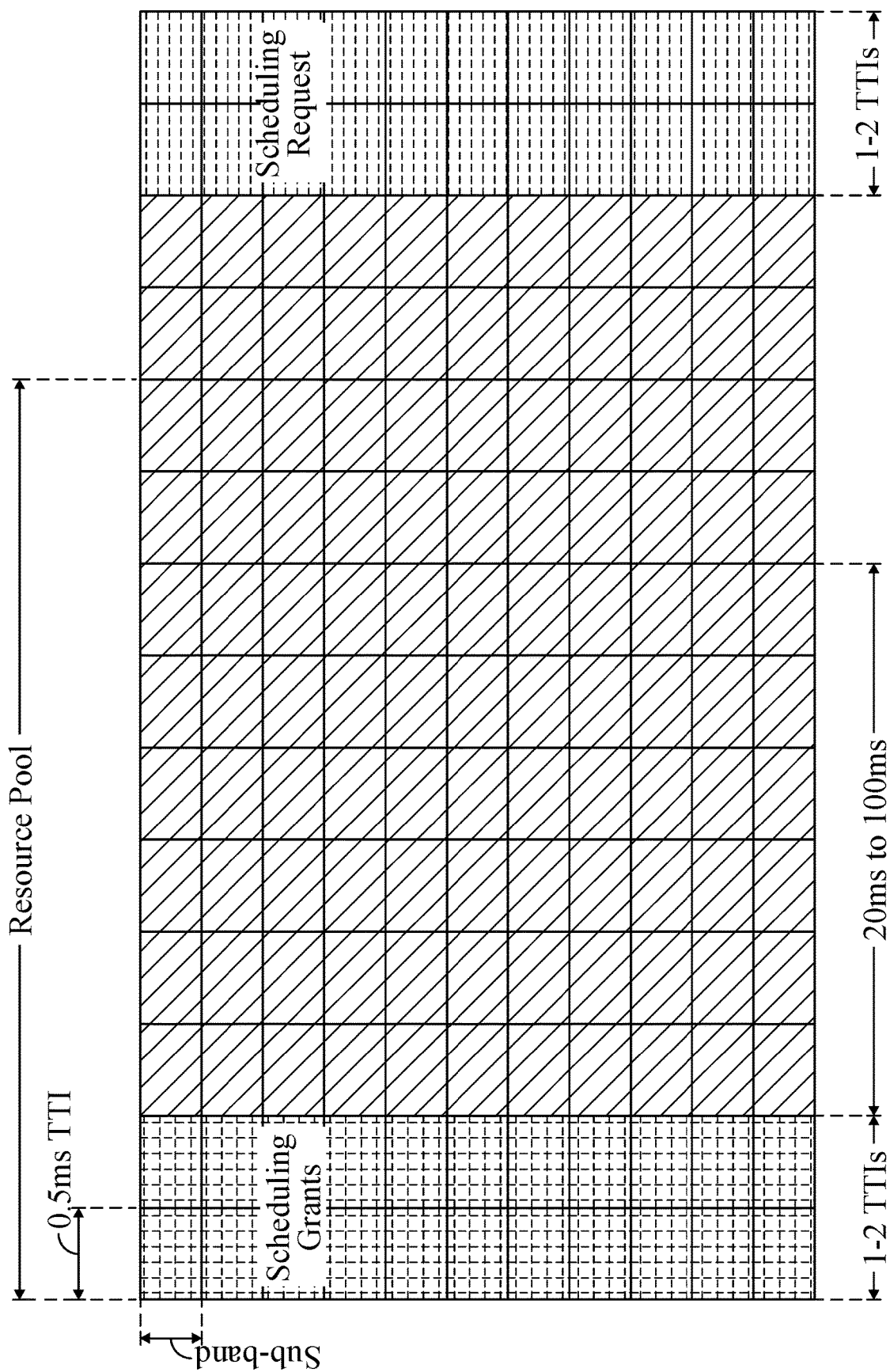
FIG. 7 illustrates an example RSU scheduling structure, in accordance with certain aspects of the present disclosure.

FIG. 7 illustrates an example resource pool and RSU scheduling, in accordance with certain aspects of the present disclosure. RSU scheduling may follow a request/response mechanism and/or a grant based scheme (e.g., similar to Uu scheduling). As shown in FIG. 7, scheduling grants and scheduling requests (SRs) may be transmitted during reserved transmission time intervals (TnIs). A scheduling grant may indicate a reservation interval or cadence. The reservation interval or cadence may be dynamically adjusted (e.g., based on traffic and/or QoS requirements).

RSU SRs may be contention-based, where the reserved TIs are used to contend for resources for access purposes. UEs can indicate their ID (identifier), traffic pattern, latency requirements, periodicity, and/or jitter, etc. UEs that are already being scheduled may be allocated specific resources for access. A listen-before-talk (LBT) mechanism and randomized traffic arrivals may reduce the contentions during each access period. UEs may register themselves with the RSU during these access periods. The RSU issues scheduling grants. A common portion of the scheduling grant is relevant to all UEs. The scheduling grants may be unicast (e.g., to take advantage of link adaptation and improve spectral efficiency). The scheduling grant contains scheduling of the UEs, the allocation of reserved TTIs, etc.

Figure 8:
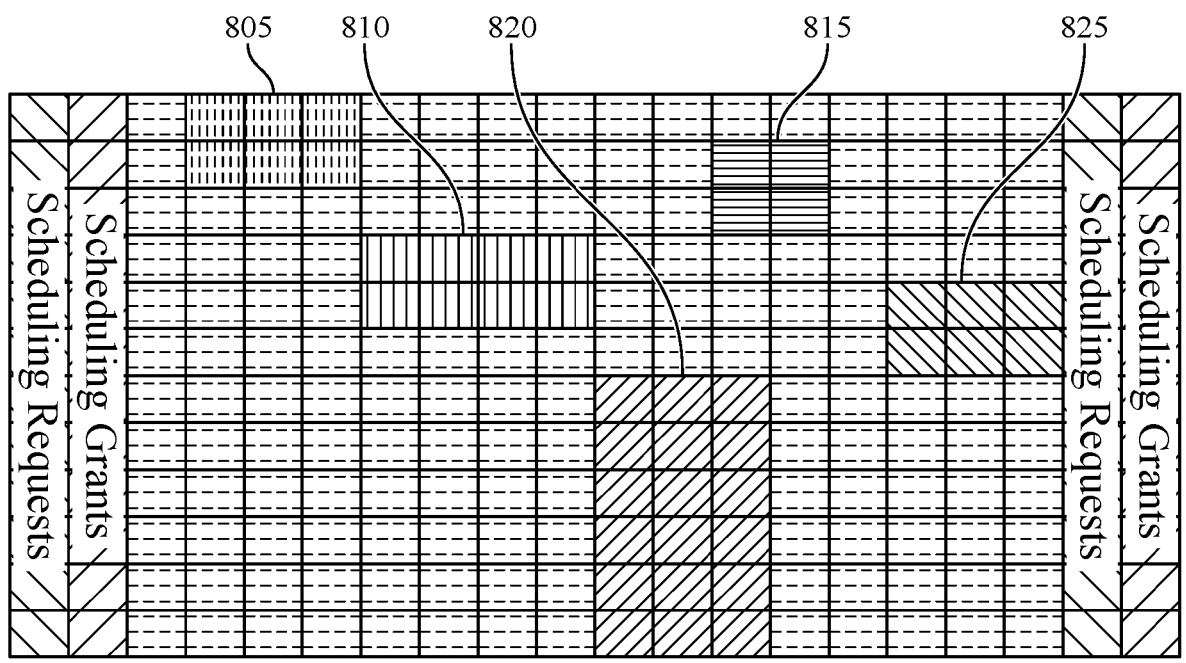
FIG. 8 illustrates an example RSU traffic scheduling, in accordance with certain aspects of the present disclosure.
Figure 9:
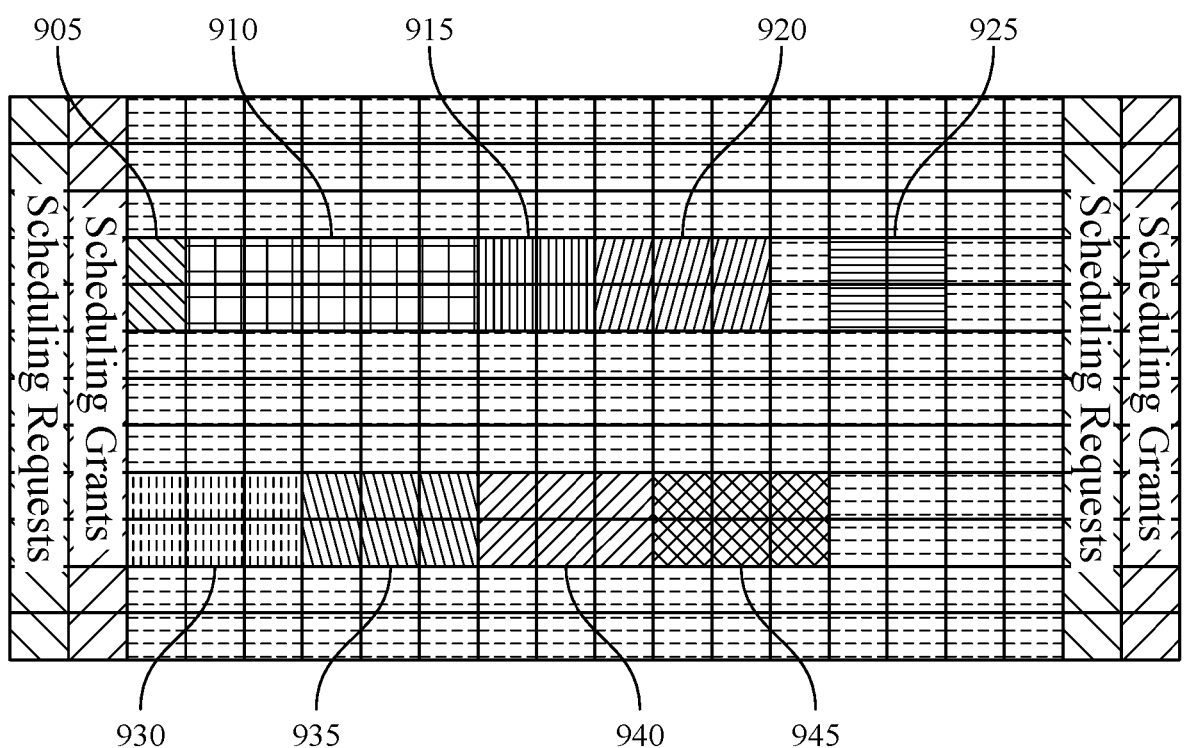
FIG. 9 illustrates another example RSU traffic scheduling, in accordance with certain aspects of the present disclosure.

RSUs may schedule traffic with a fixed or variable packet size. For a fixed packet size scheduling, fixed resources may be allocated to the UEs. The allocation sizes may not be varied. The scheduling may similar to a baseline scheduling mechanism. FIG. 8 illustrates an example RSU traffic scheduling (e.g., with 100 ms latency), in accordance with certain aspects of the present disclosure. Resource sets 805-825 may be assigned to different UEs. The resource sets 805-825 may be time division multiplexed (TDM'd) and frequency division multiplexed (FDM'd). FIG. 9 illustrates another example RSU traffic scheduling (e.g., with 100 ms latency), in accordance with certain aspects of the present disclosure. Resource sets 905-940 may assigned to different UEs. The resource sets 905-940 may be TDM'd and/or FDM'd. For variable packet size scheduling, the RSU provides the UEs with an ordering and resource allocations. The UEs can vary allocation sizes dynamically depending on traffic, however, the order may be strictly maintained. UEs that run out of resources may use the rest of the spectrum for transmission. The LBT mechanism may be used to reduce collisions. Unused resources can also be used by other UEs via LBT.

Figure 11:
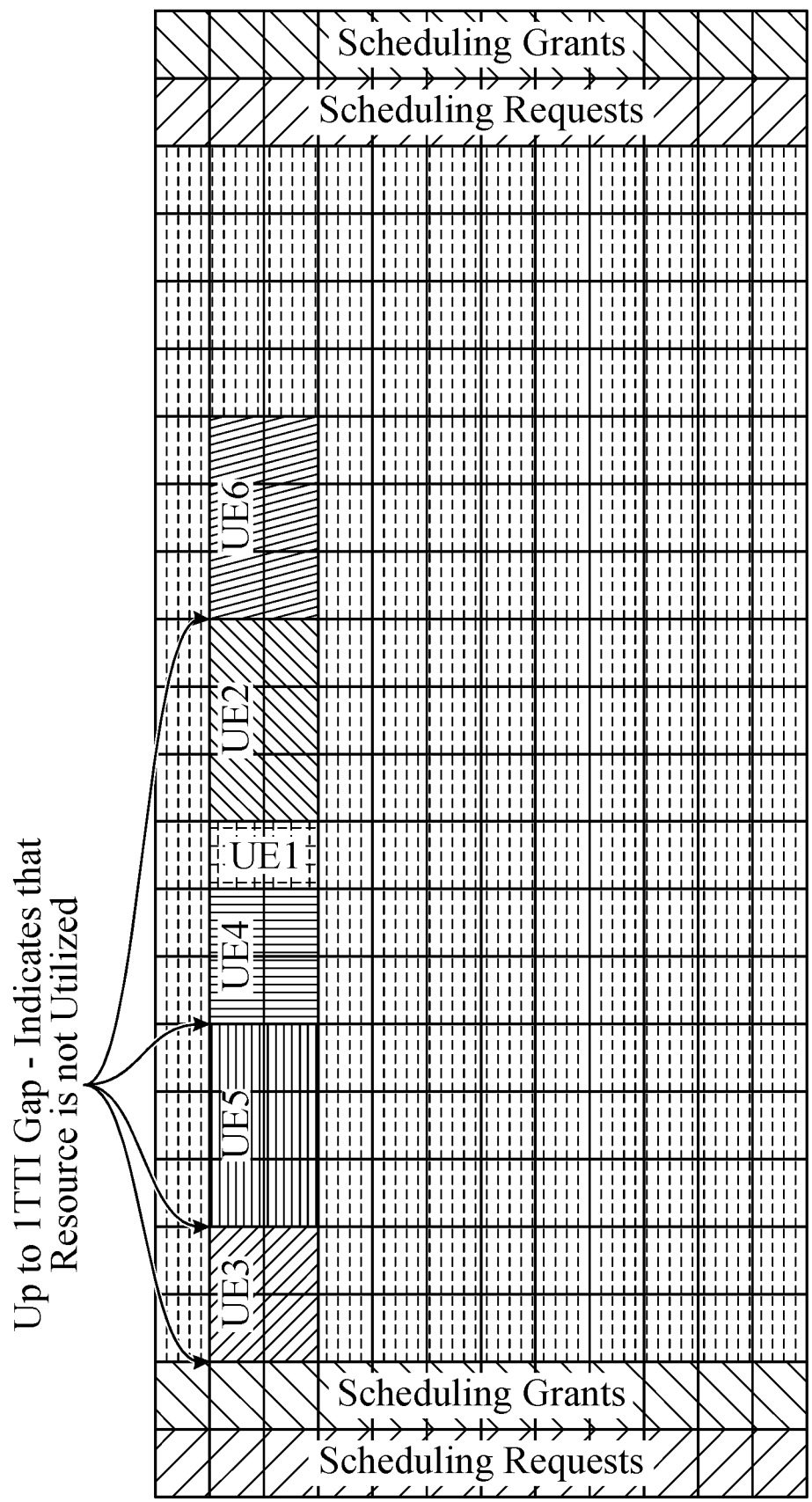
FIG. 11 illustrates example RSU traffic scheduling frames for six different UEs with variable packet size and variable latency, in accordance with certain aspects of the present disclosure.

In some cases, RSUs may schedule with a variable packet size and a variable latency. The scheduling may still follow a UE ordering. UE IDs can be repeated based on their latency requirements. In an example, UE1 and UE2 have a 20 ms latency requirement; UE3 and UE4 have a 50 ms latency requirement; UE5 and UE6 have a 100 ms latency requirement; and the UEs 1-6 have variable packet sizes. FIG. 10 and FIG. 11 illustrate example RSU traffic scheduling frames for the UEs 1-6 with variable packet size and variable latency. A gap of one-half TTI to 1 TTI indicates that the resource has not been utilized. The ordering for the next frame can begin transmission immediately after a gap. In the presence of congestion, these scheduling schemes may have lower reliability.

Figure 12:
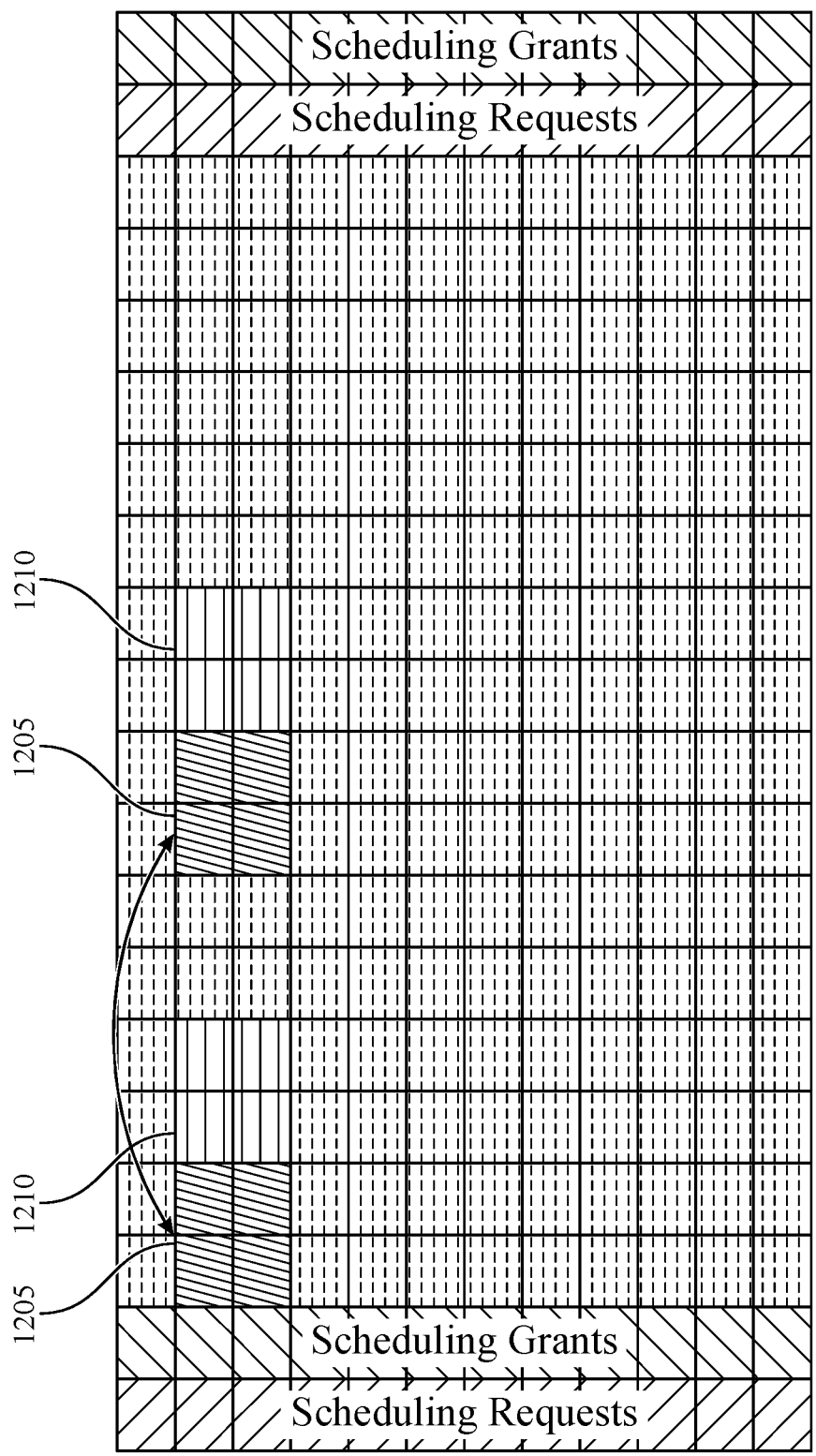
FIG. 12 illustrates another example RSU traffic scheduling with a fixed packet size and a low latency, in accordance with certain aspects of the present disclosure.

In some cases, RSUs may schedule with a fixed packet size and a low latency (e.g., 5 ms latency). The traffic may have tight QoS requirements. The scheduling can use a fixed allocation sized based on determined traffic patterns. The periodicity can be assumed to be reliable. The scheduling may account for half-duplexing. FIG. 12 illustrates example RSU traffic scheduling frames with fixed packet size and low latency. As shown in FIG. 12, the resource sets 1205 and 1210 occur at a fixed size and period.

In some cases, RSUs may schedule with a variable packet size and a low latency (e.g., 5 ms latency). The RSUs may handle all aspects of the scheduling. Overhead may increases to meet tight latency requirements. Coverage and capacity can be affected. The UEs may perform access only when they have data (e.g., when the packet size has been determined).

Figure 15:
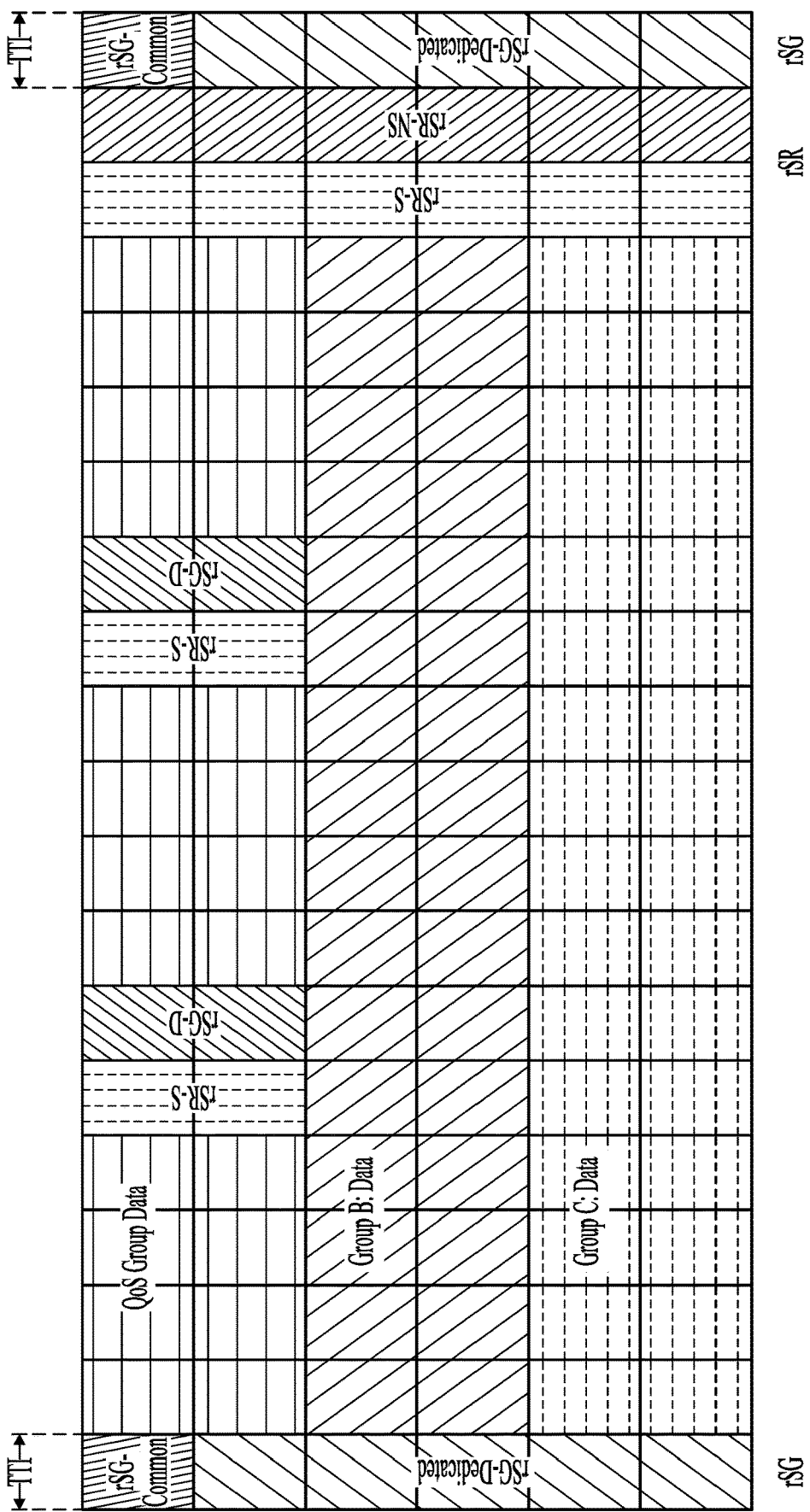
FIG. 15 illustrates another example scheduling grants for RSU traffic scheduling, in accordance with certain aspects of the present disclosure.

The RSU scheduling grant can be split into two parts, a common part (SG-Common) and a dedicated part (SG-Dedicated). The SG-Common indicates information common to all UEs. For example, the SG-Common can indicate the resource pool size, frequency/time allocation size of SG-Dedicated, periodicity of SRs, etc., as shown in FIG. 13. The SG-Dedicated indicates information pertaining to UEs that are scheduled, as shown in FIG. 14. The SG-Common may be decoded by all UEs (e.g., even including those that are not scheduled). In some cases, the SG-Dedicated and SR-S can be transmitted more frequently than the SG-Common (e.g., to meet latency requirements), as shown in FIG. 15. The SR can indicate the latency requirements and/or packet size requirements.

In some RSU resource allocation schemes, UEs to be scheduled are grouped (e.g., based on priority, application type, and/or QoS requirements). Frequency allocations can be determined based on the needs of each group. Within each group UEs can ranked based on a scheduling metric. The scheduling metric may be a variation of proportional fair scheduling that ensures that all UEs are allocated resources fairly. The scheduling metric may take into account latency constraints and recent scheduling patterns of the UEs. If a UE does not utilize its allocation (e.g., due to traffic arrival times), then the UE may be prioritized in the next scheduling grant. Each UE can transmit data in accordance with its order (per the scheduling grant). Each UE can indicate the duration of the transmission in the control signaling in its allocation. The demodulation reference signal (DMRS) sequence for each UE could also be based on the UE order. In high congestion and/or high traffic scenarios, allocated UEs may not be able to transmit within one scheduling grant period. UEs that did not transmit would have a high scheduling metric and be scheduled sooner in the next SG period.

Example High Reliability Traffic for V2X Communications

As mentioned above, in certain systems (e.g., such as vehicle-to-everything (V2X) systems and beyond) traffic may have latency and reliability targets. For example, V2X traffic may be aperiodic. V2X traffic may have a packet size of approximately 100-1000 Bytes. V2X traffic may have an arrival rate of around 50 ms. V2X may have a latency budget of around 10 ms. V2X traffic may have a target error rate less than $10^{-5}$ (i.e., 99.999% reliability). V2X traffic may have a range of around 300 m (or less). V2X may have a device density and/or traffic density half that of 3GPP traffic.

In V2X, high QoS (quality-of-service) zones may be defined. A QoS zone may be an area in which high QoS is critical. For example, high QoS V2X zones may include areas around road intersections, freeway ramps, etc. In some cases, V2X high reliability schemes may be based on UE capability.

In some examples, only sidelink devices, such as sidelink user equipment (UEs), configured for transmission (TX UEs) may be configured for high reliability V2X communication. In some examples, both TX UEs and UEs configured for receiving (RX UEs) may be configured for high reliability V2X communication. In some examples, both UEs TX UEs and facilitator UEs may be configured for high reliability V2X communication. In some examples, all UEs involved in high reliability communications may be configured for high reliability V2X communication.

V2X communications may be connection-based or connectionless-based. Connection-based V2X may refer to V2X communications in which sidelink devices register with a roadside unit (RSU) and connectionless-based V2X communication may refer to V2X communications in which sidelink device do not register with the RSU. V2X communications may involve distributed access or centralized access. Distributed access may refer to communications that do not involve RSUs and centralized access may refer to communications that do involve RSUs.

For connection-based distributed access, group sizes (e.g., UE groups) may be small (e.g., relative to connectionless-based), ACK/NACK (acknowledgment/negative acknowledgment) based feedback may be used, half-duplex communications may be used (e.g., collisions may be resolved), but link budget and spectral efficiency may impact performance. For connection-based centralized access, UEs register with RSUs and the RSU may facilitate sidelink traffic, half-duplex collisions may be reliably resolved, and spectral efficiency and interference may impact performance.

For connectionless-based distributed access, larger group sizes (e.g., UE groupings) may be used (e.g., relative to distributed access), feedback may be NACK-based only, and in addition to link-budget and spectral efficiency, half-duplex and collisions may be resolved). For connectionless-based centralized access, UEs do not register with RSU, the RSU facilitates sidelink traffic, half-duplex and collisions may be reliably resolved, and performance may be impacted due to link budget and spectral efficiency.

In some examples, RSU locations may be dynamically updated (e.g., application based, such as via Uu).

For, centralized RSU-based communications, a specific resource pool may be used (e.g., reserved/configured). For example, a resource pool may be reserved for a high QoS zone (e.g., for UEs in a zone requiring a high QoS). The resource pools may be associated with a zone ID. The resource pools may be associated with (e.g., limited to) areas around RSU locations.

Centralized RSU-based communications may use dynamic resource allocation. For example, UEs may send requests for resources during scheduling request (e.g., rSR) periods and the RSU can send resource grants during scheduling grant (e.g., rSG) periods. As discussed above, specific subframes/slots may be used (e.g., configured) for sending scheduling requests and scheduling grants. In some examples, resources for retransmissions may also be granted in advance. A set of grant-free allocations (e.g., a limited set) may be configured, statically and/or dynamically, for example by the RSU. The grant-free allocations may be used (e.g., opportunistically) by UEs, such as UEs with strict latency constraints. RSUs can act as relays for high priority and/or high QoS traffic.

According to certain aspects, the RSU (in centralized-based communications or a UE in distributed-based V2X communications) can relay traffic from UEs. For example, the RSU may broadcast high QoS traffic, transmitted by UEs in a QoS zone to all UEs in the QoS zone. This may be referred to as RSU flooding. In some examples, only high priority traffic by the TX UEs is relayed to the RX UEs by the RSU (e.g., broadcast to all UEs). Each transmission may appear to the RX UEs (e.g., the UEs receiving the RSU flood), as the original transmission. For example, the contents of the relayed/broadcast traffic by the RSU can be identical to original packet from the TX UEs. The RSU may relay/broadcast the traffic with a different code rate and/or modulation coding scheme (MCS) than the original packets from the TX UEs. For example, the RSU may change the code rate and/or MCS to fit the allocation size of the flooding slots. In some examples, all high priority traffic is FDM'd in 1-2 slots only. In some examples, the packet size may be limited (e.g., restricted) for the high priority traffic. According to certain aspects, the RSU may relay/broadcast reservation information from the UEs. For example, the RSU may relay/broadcast the reservation information of (e.g., only) high priority UEs.

Figure 16:
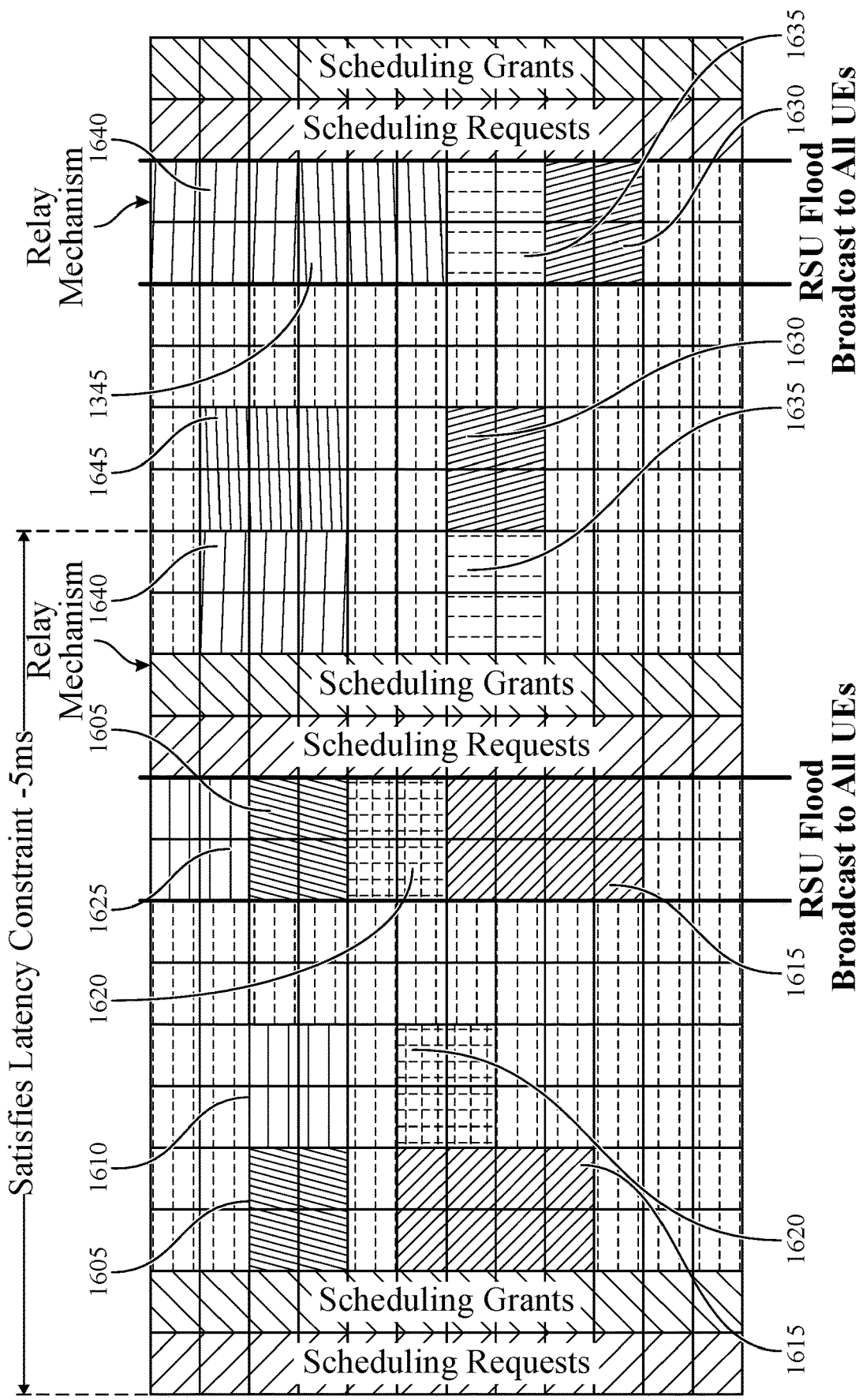
FIG. 16 illustrates another example RSU traffic scheduling with a variable packet size and a low latency, in accordance with certain aspects of the present disclosure.

As shown in FIG. 16, the transmissions in the resource sets 1605-1625 may be FDMd and relayed within a period satisfying a latency target and the transmissions in resource sets 1630-1645 may be FDM'd and relayed within another period satisfying a latency target.

According to certain aspects, the RSU may schedule the UEs. For example, the RSU may schedule the UEs within the QoS zone. The RSU may receive/detect reservation information from the UEs and schedule the UEs based on the reservation information. The RSU may schedule both initial transmissions and retransmissions. The RSU may take the reservation information of the UEs into account and schedule transmissions such that half duplex is avoided between all UEs. In some examples, the RSU scheduling uses geographical knowledge in the scheduling. In some examples, RSU flooding may be used in addition to the scheduling.

According to certain aspects, the RSU schedules the transmissions according to a scheduling algorithm. In some examples, for the scheduling, packets are ranked based on a priority level and a latency (e.g., a latency requirement). Higher ranked packets may be scheduled before lower ranked packets. For packets of equal priority and equal latency, higher data rate packets may be scheduled before lower rate packets. Initial packets may be scheduled based on number of transmissions and a latency (e.g., a latency requirement). For each subsequent packet (e.g., retransmission), the earliest available resource for initial transmission may be selected. Contention windows may be formulated based on latency requirements. For each re-transmission, the set of overlaps in frequency with UEs that have been impacted by half duplex may be minimized. The RSU can also perform congestion control, for example by modifying number of retransmissions to ensure that fit into allocated resources.

According to certain aspects, for distributed communications, a UE may act as the relay to send/broadcast traffic and/or reservation information of other UEs to all UEs and/or to schedule other UEs. As discussed above, a zone ID based resource pool configuration may be used. Specific subframes may be reserved for high QoS traffic, and the high QoS traffic can be transmitted on the reserved subframes. In some examples, the high QoS traffic can be transmitted on the reserved subframes in addition to transmitted on normal subframes. Distributed access may avoid in-band emission (IBE) and half duplex effects. In some examples, a form of linear network coding may also be applied.

Figure 17:
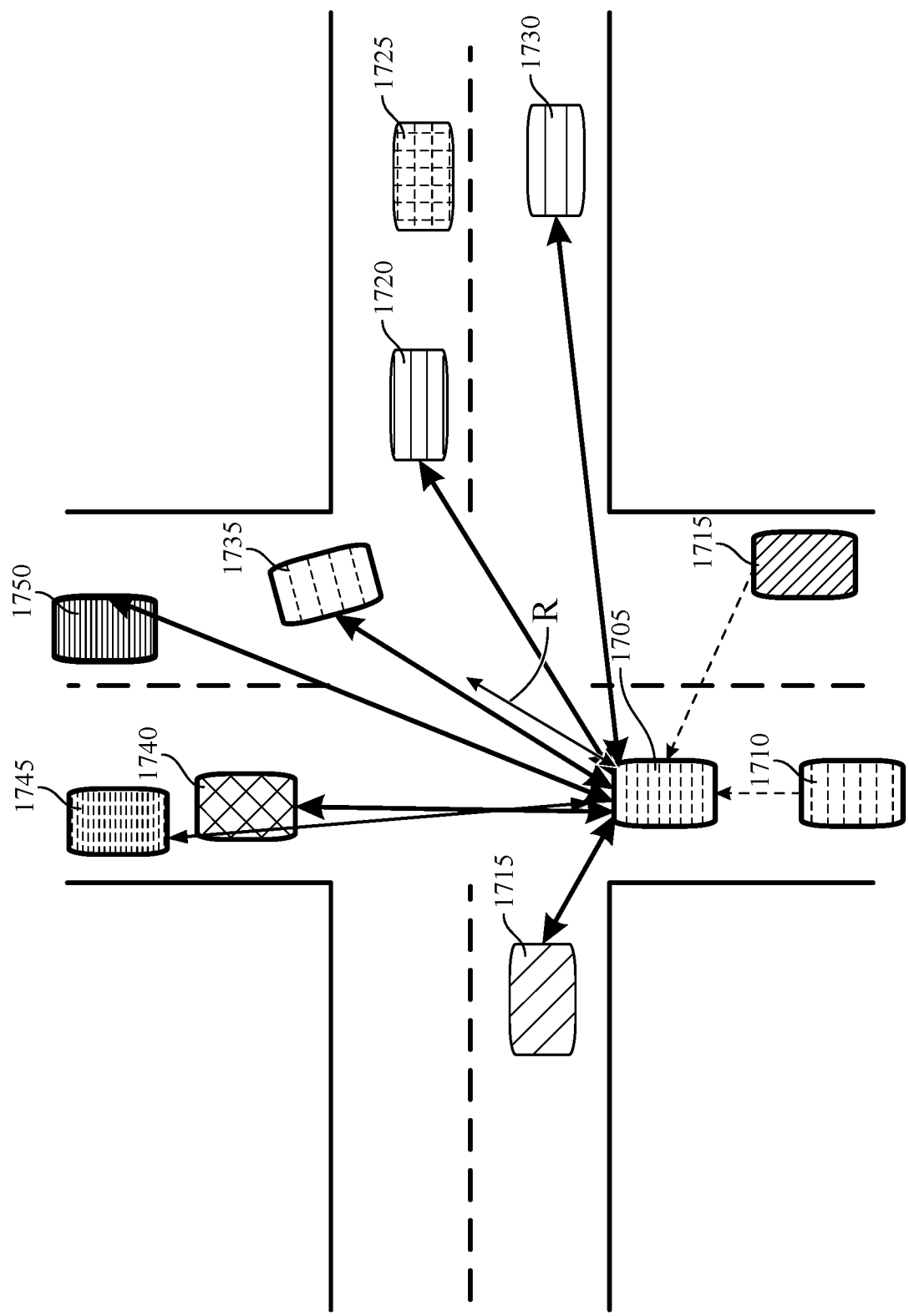
FIG. 17 is an example of a UE relay at an intersection in a V2X deployment, in accordance with certain aspects of the present disclosure.

The UEs acting as a relay may be UEs within a distance R from an intersection and may relay all high QoS traffic. As shown in FIG. 17, the UE 1705 is within a range R from the intersection. The UE 1705 detects traffic and/or reservation information from the UEs 1710-1750 and relays/broadcast the traffic and/or reservation information to all the UEs 1710-1750.

In some examples, all relayed traffic from the same TX UE may be transmitted as a single frequency network (SFN) transmission. For example, different relay UEs may relay/retransmit traffic from the TX UE. The relay UEs may relay/retransmit the same packet using the same time frequency resources (e.g., SFN). In some examples, UEs may acts as relays for connectionless-based groupcast traffic.

According to certain aspects, a group leader (e.g., a UE) plays the role of RSU. For example, all of the UEs in the group (e.g., a group of UEs within a range of an intersection) may vote on one of the UEs as the group leader. The group leader may relay traffic and/or reservation as discussed above for the RSU. The group leader may schedule the UEs in the group based on reservation information from the UEs, as discussed above for the RSU. In some examples, the group leader may receive assistance information, from one or more UEs in the group of UEs, and use the assistance information for resource allocation. For example, the group leader may schedule the UEs to provide receiver side protection. In some examples, the RX UEs can indicate, in the assistance information, desired resources. The RX UEs may select the desired resources based on an observed resource map. The desired resources may be indicated via medium access control (MAC) signaling and/or radio resource control (RRC) signaling. The desired resources may be signaled along with normal traffic data. The group leader may select an intersection of all the RX resources (e.g., desired resources commonly indicated by the RX UEs) for high QoS transmissions. In some examples, the physical sidelink feedback channel (PSFCH) may be used to convey assistance information.

In some examples, there may be multiple physical sidelink control channel (PSCCH) locations within a slot. For example, there may be multiple available frequency locations within a slot available for PSCCH. In some examples, reservation information and/or assistance information may be transmitted in the PSCCH. With the multiple available frequency locations for the PSCCH, the PSCCH may be decoded even if collisions occur. For example, if overlapping transmissions collide and PSCCH location is fixed, then the PSCCH may not be decoded; however, with multiple locations, even when transmissions collide, the PSCCH may still be decodable. In some examples, the PSCCH may be transmitted at much lower code rates to enable detection in interference limited scenarios. Both the TX UEs and RX UEs may be capable of high reliability communications.

Operations for high reliability V2X communications may be performed, for example by a BS, UE, and/or or RSU, in accordance with certain aspects of the present disclosure. In some examples, a BS and/or UE may operate as an RSU and/or a relay. Operations by a BS may be implemented as software components that are executed and run on one or more processors (e.g., controller/processor 240 of FIG. 2). Further, the transmission and reception of signals by the BS in operations may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals. Operations by a UE may be implemented as software components that are executed and run on one or more processors (e.g., controller/processor 280 of FIG. 2). Further, the transmission and reception of signals by the UE in operations may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Figure 18:
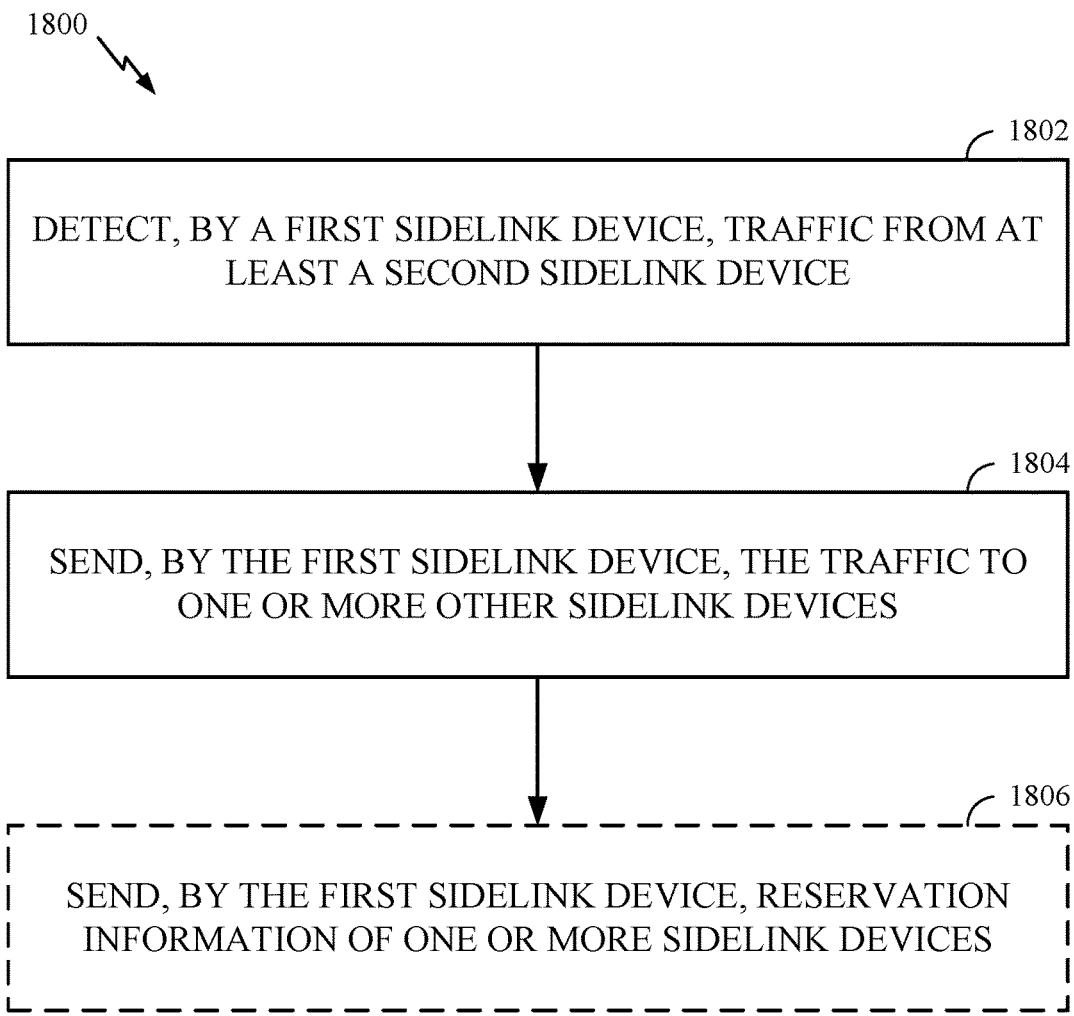
FIG. 18 is a flow diagram illustrating example operations for wireless communication by a sidelink device, in accordance with certain aspects of the present disclosure.

FIG. 18 is a flow diagram illustrating example operations 1800 for wireless communication, in accordance with certain aspects of the present disclosure. The operations 1800 may be performed, for example, by a sidelink device (e.g., the UE 120a in the wireless communication network 100 or an RSU).

The operations 1800 may begin, at 1802, by detecting traffic from at least a second sidelink device.

At 1804, the sidelink device sends the traffic to one or more other sidelink devices. In some examples, the second sidelink device and the one or more other sidelink devices are not associated (e.g., not registered) with the RSU. The one or more other sidelink devices may be UEs. The UE may be within a threshold distance from a road intersection.

The traffic may be detected in a resource pool associated with a high QoS zone. The resource pool may be associated with specific subframes, slots, or both, for transmitting scheduling requests, scheduling grants, traffic, or a combination thereof.

In some examples, the sidelink device detects (e.g., identifies) the traffic as high priority traffic, and sends the traffic to the one or more other sidelink devices based on the detecting the traffic as high priority traffic. For example, the sidelink device may detect traffic as high priority traffic based on a quality-of-service (QoS) associated with the traffic or a priority level of the at least the second sidelink device.

In some examples, sending the traffic may include sending (e.g., broadcasting) the high priority traffic in one or two allocated slots (e.g., flooding slots). The high priority traffic may be FDMd in the one or more two allocated slots. Sending the traffic may include detecting one or more packets from the second sidelink device and sending (e.g., broadcasting) the one or more packets with identical content. Sending the traffic may include sending (e.g., broadcasting) the one or more packets with a different code rate, MCS, or both than the detected one or more packets. Sending the traffic may include sending the traffic the traffic as a SFN transmission using the same time and frequency resources as another sidelink device to send the traffic from the at least the second sidelink device to the one or more other sidelink devices.

In some examples, at 1806, the first sidelink device broadcasts reservation information of one or more sidelink devices.

Figure 19:
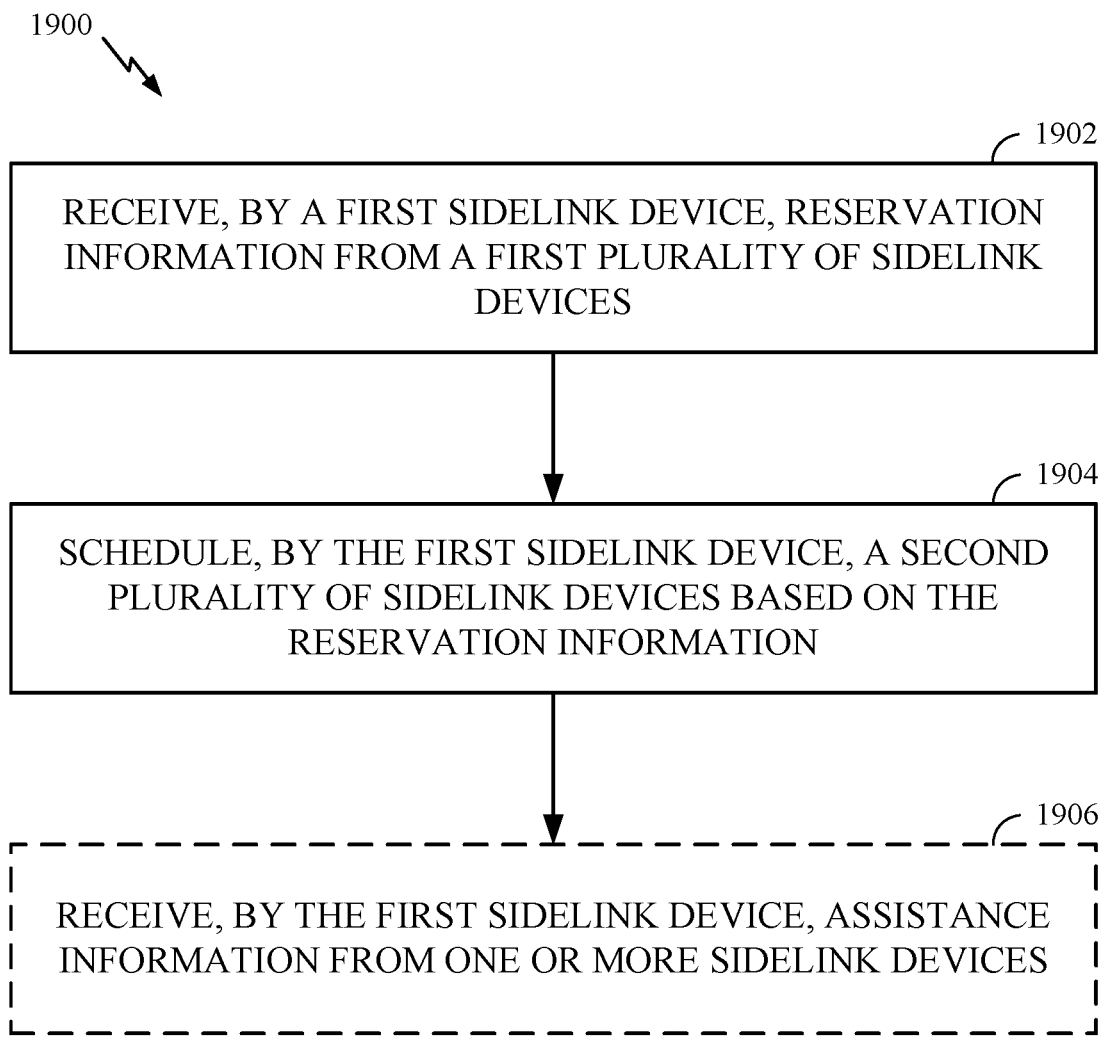
FIG. 19 is a flow diagram illustrating example operations for wireless communication by a sidelink device, in accordance with certain aspects of the present disclosure.

FIG. 19 is a flow diagram illustrating example operations 1900 for wireless communication, in accordance with certain aspects of the present disclosure. The operations 1900 may be performed, for example, by a sidelink device (e.g., the UE 120*a* in the wireless communication network 100 or an RSU). The operations 1900 may be implemented as software components that are executed and run on one or more processors (e.g., controller/processor 280 of FIG. 2). Further, the transmission and reception of signals by the UE in operations 1900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The first sidelink device (e.g., RSU or UE) may be a sidelink device that is within a threshold distance from a road intersection.

The operations 1900 may begin, at 1902, by receiving reservation information from a first plurality of sidelink devices. The first plurality of sidelink devices may be registered with the RSU. The reservation information may be detected on a PSCCH at multiple frequency locations within a slot.

At 1904, the sidelink device schedules a second plurality of sidelink devices based on the reservation information. In some examples, scheduling the second plurality of sidelink devices includes scheduling initial transmissions, and/or retransmissions in order to avoid collisions between the second plurality of sidelink devices.

In some examples, the scheduling is according to a scheduling algorithm. For example, the sidelink device may rank packets based on priority levels and/or latency targets, schedule higher ranked packets before lower ranked packets, and schedule packets with a higher data rate before equally ranked packets with a lower data rate. The scheduling may include selecting an earliest available resource for initial transmissions, determining a contention windows based on latency targets associated with the initial transmissions, and, for retransmissions, minimizing the frequency overlap between transmissions in the contention window.

In some examples, at 1906, the sidelink device may receive assistance information from one or more] sidelink devices and schedule the second plurality of sidelink device further based on the assistance information. The assistance information may include a requested resource allocation by the sidelink device. The sidelink device may select resources requested by a highest number of the sidelink devices for high priority traffic.

Figure 20:
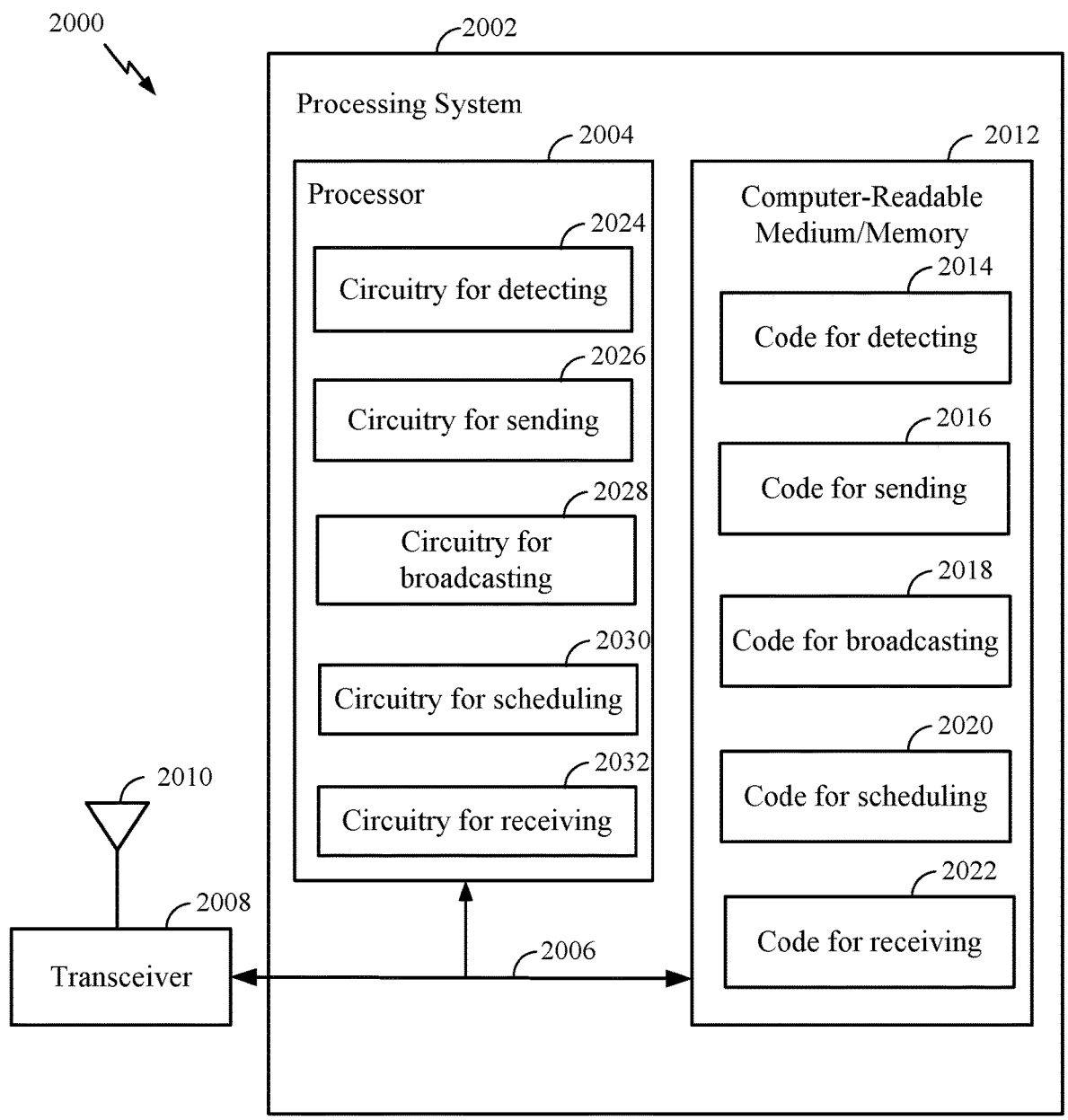
FIG. 20 illustrates a communications device that may include various components configured to perform operations for the techniques disclosed herein in accordance with aspects of the present disclosure.

FIG. 20 illustrates a communications device 2000 that may include various components (e.g., corresponding to means-plus-function components) configured to perform operations for the techniques disclosed herein for high reliability V2X communications. The communications device 2000 includes a processing system 1702 coupled to a transceiver 2008. The transceiver 2008 is configured to transmit and receive signals for the communications device 2000 via an antenna 2010, such as the various signals as described herein. The processing system 2002 may be configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/memory 2012 is configured to store instructions (e.g., computer-executable code) that when executed by the processor 2004, cause the processor 2004 to perform the various techniques discussed herein for high reliability V2X communications. In certain aspects, computer-readable medium/memory 2012 stores code 2014 for detecting; code 2016 for sending; code 2018 for broadcasting; code 2020 for scheduling; and/or code 2022 for receiving, in accordance with aspects of the disclosure. In certain aspects, the processor 2004 has circuitry configured to implement the code stored in the computer-readable medium/memory 2012. The processor 2004 includes circuitry 2024 for detecting; circuitry 2026 for sending; circuitry 2028 for broadcasting; circuitry 2030 for scheduling; and/or circuitry 2032 for receiving, in accordance with aspects of the disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein for high reliability V2X communications, in accordance with aspects of the disclosure.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first sidelink device, comprising:
   detecting high priority traffic from at least a second sidelink device in more than two slots; and
   in response to detecting the high priority traffic, sending the high priority traffic to one or more other sidelink devices in one or two allocated slots, wherein:
   the first sidelink device comprises a roadside unit (RSU); and
   the second sidelink device and the one or more other sidelink devices are not registered with the RSU.

2. The method of claim 1, further comprising detecting traffic as the high priority traffic based on a quality-of-service (QoS) associated with the traffic or a priority level of the at least the second sidelink device.

3. The method of claim 1, wherein sending the high priority traffic comprises frequency division multiplexing traffic detected from a plurality of sidelink devices in the one or two allocated slots, and wherein at least a portion of the high priority traffic is sent on different frequency resources than frequency resources on which the high priority traffic is detected.

4. The method of claim 1, wherein:
   detecting the high priority traffic comprises detecting packets from a plurality of sidelink devices; and
   sending the high priority traffic comprises broadcasting one or more of the packets with identical content to a plurality of sidelink devices.

5. The method of claim 4, wherein sending the high priority traffic comprises sending the one or more packets with a different code rate than the detected packets, a different modulation and coding scheme (MCS) than the detected packets, or both.

6. The method of claim 1, wherein sending the high priority traffic comprises sending only reservation information.

7. The method of claim 1, wherein the high priority traffic is detected in resources in a resource pool associated with a high quality-of-service (QoS) zone, and wherein the resource pool is associated with a specific subframe for transmitting scheduling requests, transmitting scheduling grants, transmitting traffic, or a combination thereof.

8. The method of claim 1, wherein the one or more other sidelink devices comprises one or more high priority user equipment (UEs).

9. The method of claim 1, wherein the first sidelink device is within a threshold distance from a road intersection.

10. The method of claim 1, wherein sending the high priority traffic comprises sending the high priority traffic as a single frequency network (SFN) transmission using the same time resources and the same frequency resources as another sidelink device.

11. An apparatus comprising:
    at least one processor; and
    a memory coupled to the at least one processor, the memory comprising code executable by the at least one processor to cause the apparatus to:
    detect high priority traffic from at least one sidelink device in more than two slots; and
    in response to detecting the high priority traffic, send the high priority traffic to one or more other sidelink devices in one or two allocated slots, wherein:
    the apparatus comprises a roadside unit (RSU); and
    the at least one sidelink device and the one or more other sidelink devices are not registered with the RSU.

12. The apparatus of claim 11, wherein the code is further executable by the at least one processor to cause the apparatus to detect traffic as the high priority traffic based on a quality-of-service (QoS) associated with the traffic or a priority level of the at least one sidelink device.

13. The apparatus of claim 11, wherein the code is further executable by the at least one processor to cause the apparatus to frequency division multiplex traffic detected from a plurality of sidelink devices in the one or two allocated slots, and wherein at least a portion of the high priority traffic is sent on different frequency resources than frequency resources on which the high priority traffic is detected.

14. The apparatus of claim 11, wherein:
    detecting the high priority traffic comprises detecting packets from a plurality of sidelink devices; and
    sending the high priority traffic comprises broadcasting on or more of the packets with identical content to a plurality of sidelink devices.

15. The apparatus of claim 14, wherein the code executable by the at least one processor to cause the apparatus to send the high priority traffic comprises code executable by the at least one processor to cause the apparatus to send the one or more packets with a different code rate than the detected packets, a different modulation and coding scheme (MCS) than the detected packets, or both.

16. The apparatus of claim 11, wherein the code executable by the at least one processor to cause the apparatus to send the high priority traffic comprises code executable by the at least one processor to cause the apparatus to send only reservation information.

17. The apparatus of claim 11, wherein the high priority traffic is detected in resources in a resource pool associated with a high quality-of-service (QoS) zone, and wherein the resource pool is associated with a specific subframe for transmitting scheduling requests, transmitting scheduling grants, transmitting traffic, or a combination thereof.

18. The apparatus of claim 11, wherein the one or more other sidelink devices comprises one or more high priority user equipment (UEs).

19. The apparatus of claim 11, wherein the apparatus is within a threshold distance from a road intersection.

20. The apparatus of claim 11, wherein the code executable by the at least one processor to cause the apparatus to send the high priority traffic comprises code executable by the at least one processor to cause the apparatus to send the high priority traffic as a single frequency network (SFN) transmission using the same time resources and the same frequency resources as another sidelink device.

21. An apparatus comprising:
    means for detecting high priority traffic from at least one sidelink device in more than two slots; and
    means for, in response to detecting the high priority traffic, sending the high priority traffic to one or more other sidelink devices in one or two allocated slots, wherein:
    the apparatus comprises a roadside unit (RSU); and
    the at least one sidelink device and the one or more other sidelink devices are not registered with the RSU.

22. The apparatus of claim 21, wherein means for detecting the high priority traffic comprises means for detecting traffic as the high priority traffic based on a quality-of-service (QoS) associated with the traffic or a priority level of the at least one sidelink device.

23. The apparatus of claim 21, wherein the high priority traffic is detected in resources in a resource pool associated with a high quality-of-service (QoS) zone, and wherein the resource pool is associated with a specific subframe for transmitting scheduling requests, transmitting scheduling grants, transmitting traffic, or a combination thereof.

24. The apparatus of claim 21, wherein means for sending the high priority traffic comprises means for frequency division multiplexing traffic detected from a plurality of sidelink devices in the one or two allocated slots, and wherein at least a portion of the high priority traffic is sent on different frequency resources than frequency resources on Which the high priority traffic is detected.

25. The apparatus of claim 21, wherein:
   means for detecting the high priority traffic comprises means for detecting packets from a plurality of sidelink devices; and
   means for sending the traffic comprises means for broadcasting one or more of the packets with identical content to a plurality of sidelink devices.

26. The apparatus of claim 25, wherein means for sending the high priority traffic comprises means for sending the one or more packets with a different code rate than the detected packets, a different modulation and coding scheme (MCS) than the detected packets, or both.

27. The apparatus of claim 21, wherein means for sending the high priority traffic comprises means for sending only reservation information.

28. The apparatus of claim 21, wherein the one or more other sidelink devices comprises one or more high priority user equipment (UEs).

29. The apparatus of claim 21, wherein the apparatus is within a threshold distance from a road intersection.

30. The apparatus of claim 21, wherein means for sending the high priority traffic comprises means for sending the high priority traffic as a single frequency network (SFN) transmission using the same time resources and the same frequency resources as another sidelink device.

31. A non-transitory computer-readable medium having computer-executable instructions stored thereon that, when executed by a processor of a first sidelink device, cause the first sidelink device to perform a method for wireless communication, comprising:
   detecting high priority traffic from at least a second sidelink device in more than two slots; and
   in response to detecting the high priority traffic, sending the high priority traffic to one or more other sidelink devices in one or two allocated slots, wherein:
      the first sidelink device comprises a roadside unit (RSU); and
      the second sidelink device and the one or more other sidelink devices are not registered with the MU.

* * * * *